June 20, 1967  A. R. MOXLEY ET AL  3,326,256
PROCESS AND APPARATUS FOR CLEANING PEANUTS
Filed Jan. 10, 1964  2 Sheets-Sheet 1
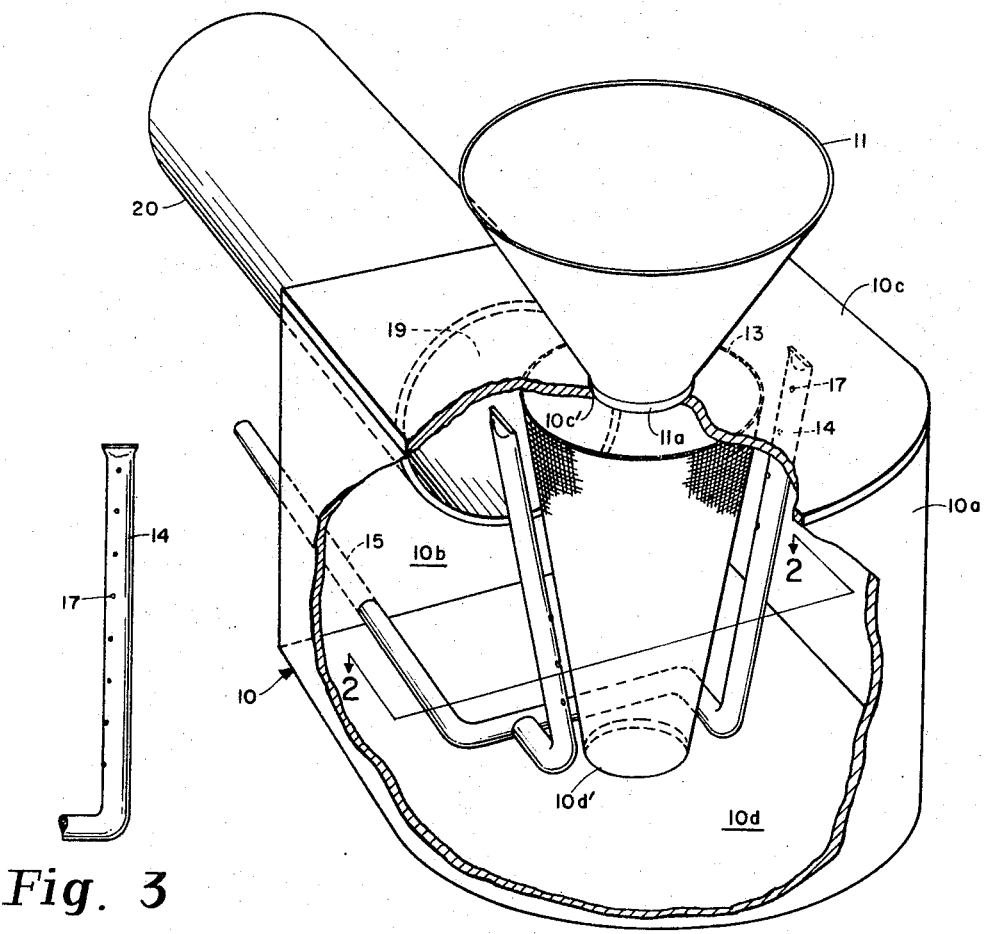
Fig. 1
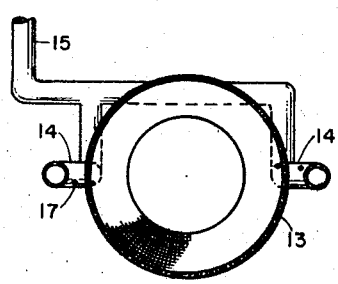
Fig. 2
Fig. 3
INVENTORS
Harsch C. Ince
Arthur R. Moxley
BY
ATTORNEY and Patented June 20, 1967

3,326,256
PROCESS AND APPARATUS FOR CLEANING PEANUTS
Arthur R. Moxley, Cincinnati, Ohio, and Harsch C. Ince, Glenolden, Pa., assignors to The Procter & Gamble Company, Cincinnati, Ohio, a corporation of Ohio
Filed Jan. 10, 1964, Ser. No. 337,024
6 Claims. (Cl. 146—226)

This invention relates to a process and apparatus for the cleaning of roasted, blanched peanuts to remove charred skin and other dark colored materials from the peanut surfaces.

In the conventional process for manufacturing peanut butter, the peanuts are first roasted and then blanched. In the blanching process the peanuts are typically forced between a moving rubber belt and a stationary, rubber-covered steel plate, and by this procedure the major portion of the peanut skins are removed from the peanuts. The skins and light foreign material which have been removed from the peanuts by the coaction of the rubber belt and plate of the blancher are separated from the peanuts by a suction device. The roasted, blanched peanuts are subsequently processed in a conventional grinding device.

It has been found that the blanching process is not completely effective in removing the undesirable particles of peanut skin and foreign material from the peanuts. This lack of efficacy is thought to be due, in part at least, to the surface embedding of particles in the peanuts and affects the quality of the peanut butter prepared from the processed peanuts, by imparting specks and a gray cast thereto and adversely affecting the flavor. In view of this shortcoming in the conventional blanching process it has heretofore been found necessary to use only the best grade peanuts (U.S. No. 1) available to produce peanut butter of good appearance, color and flavor. If the less expensive lower grades of peanuts, for instance U.S. Splits, are used with conventional equipment, the resulting peanut butter product is so unsatisfactory from a commercial standpoint as to be non-competitive with leading peanut butter brands. It should be noted, however, that even if U.S. No. 1 peanuts are used with conventional equipment, the appearance, color and flavor of the resulting peanut butter product can be improved.

U.S. No. 1 peanuts contain no more than 0.1% foreign material; U.S. Splits contain no more than 0.2% foreign material. (As used herein "foreign material" means pieces or loose particles of any substance other than the peanut or peanut skins.) Thus, it will be recognized that the improved quality of the product produced from U.S. No. 1 peanuts as compared to that produced from U.S. Splits is due primarily to the elimination of some of the foreign material in the starting ingredients.

It is an object of this invention to provide a process and apparatus for the effective cleaning of roasted and blanched peanuts.

It is another object of this invention to provide a process and apparatus which permits the manufacture of peanut butter of improved appearance, color and flavor as compared to conventionally manufactured peanut butter and the production of a commercially acceptable peanut butter from U.S. Splits.

Briefly stated, in accordance with one embodiment of this invention, there is provided an apparatus comprising an open-ended, vertically-oriented channel having a substantially rigid, air pervious reticulated wall; a source of air at a pressure above atmospheric connected to a nozzle which directs the air at high velocity across the channel and into the wall; and suction means which acts on the outer surface of the wall. Peanuts are gravity fed at a constant rate into the channel, where they are driven against the reticulated wall by high velocity air emanating from the nozzle. The impact of the peanuts on the wall breaks the particles of peanut skin and foreign material loose from the peanuts and these particles are pulled through the reticulated wall be the suction means, to thereby effect the separation of the cleaned peanuts and the undesirable particles.

While the specification concludes with claims particularly pointing out and distinctly claiming the subject matter of the present invention, it is believed the invention will be better understood from the following description taken in connection with the accompanying drawings in which:

FIGURE 1 is a perspective view, partially broken away to show interior details of construction, of a preferred embodiment of an apparatus of the present invention;

FIGURE 2 is a view in section taken along the line 2—2 of FIG. 1;

FIGURE 3 is a view in elevation of a nozzle of the embodiment of FIGURE 1 showing the arrangement of the orifices.

Figure 4:
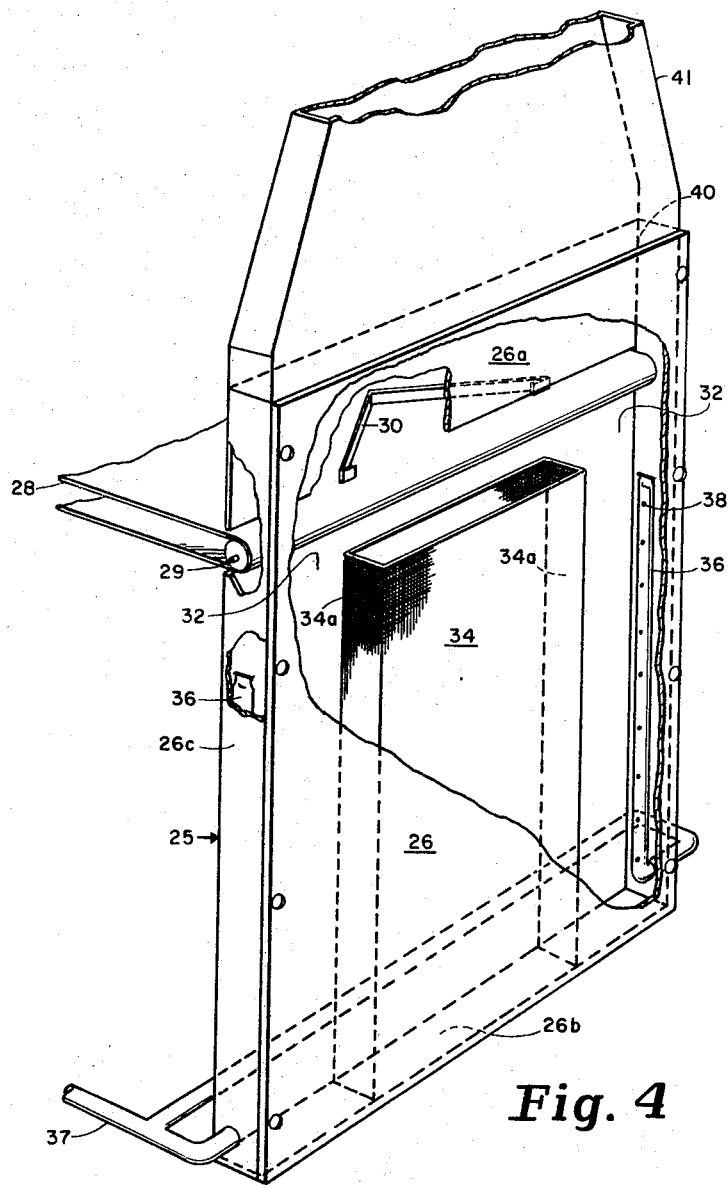
FIGURE 4 is a perspective view, partially broken away to show interior details of construction, of, another embodiment of an apparatus of the instant invention.

Referring to FIGURE 1 there is shown an enclosure 10 comprising a substantially U-shaped sidewall 10a, backwall 10b, top wall 10c and bottom wall 10d suitably secured together by welding, screws or other means well known in the art. The enclosure 10 may be constructed of sheetmetal, plastic or any other substantially air impervious rigid material. The top wall 10c and bottom wall 10d are provided with aligned circular openings 10c' and 10d', respectively, approximately centered therein. A sheetmetal funnel-shaped hopper 11 is attached to the top wall 10c by wedged engagement of its cylindrical base 11a within the opening 10c', establishing free communication between the interiors of the hopper 11 and enclosure 10.

An endless inverted, frusto-conically shaped, open-ended screen 13 is housed within the enclosure 10. While it is possible to utilize a screen 13 of cylindrical configuration, the conical form is preferred. The screen 13 has a height approximately equal to that of the enclosure 10 interior and is fixed within the enclosure in axial alignment with the openings 10c' and 10d'. The circular base of the screen 13 matches the diameter of the opening 10d', with which it is registered and the top thereof abuts against the inner surface of top wall 10c, surrounding the opening 10c'. The screen 13 is preferably constructed from an air pervious, substantially rigid, metallic fabric, the interstices of which have cross-sectional areas of less than about 0.0013 square inch. The functions of the screen 13 include the provision of a feed path or channel, an impact and abrading surface and means to restrain the peanuts while undesirable particles are removed therefrom, all of which will be more clearly understood when taken in connection with the subsequent description.

Two upwardly extending inclined nozzles 14 constructed of tubing, the ends of which have been sealed by crimping, are in juxtaposition with the screen 13. The nozzles 14 are each located next to and parallel with diametrically opposed portions of the screen 13. Each of the nozzles 14 is connected to a conduit 15 which is in communication with a source of air, not shown, at a pressure substantially above atmospheric, e.g., at 30 to 80 p.s.i.g. Arranged in a spiral path on each nozzle 14 are a multiplicity of spaced orifices 17 sized to permit air to flow therethrough at reduced pressure and at a high velocity. When processing peanuts at a rate of between about 2300 to 2400 pounds per hour the air jets preferably have a velocity in excess of 3000 feet per minute and a total flow rate in the range of 60 to 300 cubic feet per minute. The orifices may, for example, have a diameter of three thirty-seconds to one-eighth of an inch. On each nozzle 14 the uppermost orifice 17 is adapted to direct air substantially perpendicular to the adjacent portion of screen 13, the jet from each being slightly off-center with respect to the other. The air emanating from each successive lower orifice is directed obliquely of the screen 13, at an angle with the screen which is smaller than that of the air from the preceding orifice, the lowermost directing the air flowing therethrough in an almost tangential direction. This arrangement is most clearly shown in FIGURES 2 and 3. Thus, the direction of the air stream from each nozzle through the screen 13 is approximately diametrical at the top thereof and gradually changes, step-by-step, to substantial alignment with chords of progessively shorter length as the base is approached.

Referring again to FIGURE 1, the backwall 10b of enclosure 10 is provided with a suction port 19. Attached to the back wall 10b and in communication with suction port 19 is a suction means for collecting debris, partly shown by duct 20, the means being at a substantially lower pressure than the interior of screen 13.

With the apparatus depicted in FIGURES 1, 2 and 3 the roasted, blanched peanuts are fed into hopper 11 at a substantially constant rate and fall into the interior of screen member 13 within the enclosure 10. Because of the relationships established heretofore the peanuts are gravity fed along a predetremined path in the central portion of the screen 13. The orifices 17 direct air through screen 13 and cause the peanuts to move against and across screen 13 in a more or less helical path. The upper air jets thrust the peanuts at high speed in a transverse direction causing them to impinge at an angle substantially normal to the inner surface of screen 13. The impact of the peanuts on the screen 13 breaks loose many of the particles of peanut skins and foreign material adhering to or embedded in the peanuts. Then the lower air jets direct the rebounding impacted peanuts back to the screen 13 and cause them to follow a generally helical path in a downward direction, further cleaning the peanuts by the abrasive action of the screen. Thereby, many remaining particles of skin and foreign material are removed. The suction means acts on the dorsal (outer) side of the screen 13, pulling the removed particles through the interstices thereof into suction port 19 and thereby separates them from the cleaned peanut meats. The peanut meats then fall through the opening 10d' in the bottom wall 10d of enclosure 10 and may be collected by any suitable means for the subsequent grinding operation.

Another embodiment of an apparatus within the scope of the instant invention is depicted in FIGURE 4. With continuing reference to FIGURE 4 reference numeral 25 indicates a rectangular enclosure open at the top and partially open at the bottom and comprising front wall 26, back wall 26a, bottom wall 26b and side walls 26c suitably secured together by welding, screws or other means well known in the art. The enclosure 25 may be constructed of sheet metal, plastic or any other substantially air impervious rigid material.

There is a rectangular slot toward the top and running the width of back wall 26a through which passes feed belt 28 trained about idler pulley 29. The pulley 29 is provided with trunnions which are supported by bearings, not shown, mounted on sidewalls 26c. The feed belt 28 is designed to convey peanuts from a source of supply such as a balancer to the interior of the enclosure 25. There is sufficient clearance between the upper surface of the belt 28 and the top of the slot to allow entry of peanuts into the enclosure. A V-shaped guide 30 is cantilevered from the rear of enclosure 25, positioned substantially parallel to and almost touching belt 28. Guide 30 splits the flow of the conveyed peanuts into two paths, each directed toward a separate feed channel 32 (hereafter to be described) of enclosure 25.

An open-end, vertically oriented screen member 34 of rectangular cross-section is centered within the enclosure 25 and extends from the bottom wall 26b thereof to a level directly below the idler pulley 29. The remainder of the interior of the enclosure 25 below the pulley 29 comprises a pair of similarly sized, oppositely disposed feed channels 32, each of which lies intermediate a sidewall 34a of screen 34 and an adjacent sidewall 26c. The enclosure 25 is open below channel 32 and closed below screen 34 by bottom wall 26b. The screen 34 is preferably constructed from an air pervious, substantially rigid, metallic fabric the interstices of which are less than about 0.0013 square inch, e.g., 20-mesh screen. The function of each of the sidewalls 34a is similar to that of the screen 13 of the previously described embodiment, providing an impact surface and means to restrain the peanuts while undesirable particles are removed therefrom, all of which will be more clearly understood when taken in connection with the subsequent description.

Within the channels 32 and contiguous to enclosure sidewalls 26c are vertically oriented nozzles 36. Each of the nozzles 36 is connected to a conduit 37 which is in communication with a source of air, not shown, at a pressure substantially above atmospheric. Each of the nozzles 36 contains a multiplicity of spaced orifices 38 which are substantially opposite screen sidewalls 34a. The orifices 38 are sized to permit air to flow therethrough at reduced pressure and at high velocity. In this connection the ranges of air pressure, velocity, flow rate and diameters of orifices previously given are also applicable to this embodiment. The high velocity air jets discharged from the orifices flow in the direction generally perpendicular to the screen sidewalls 34a.

The top opening in enclosure 25 functions as a suction port 40. Attached to enclosure 25 and in communication with suction port 40 is a suction means for collecting debris, partially shown by duct 41, the means being at a substantially lower pressure than the interior of channels 32.

With the apparatus depicted in FIGURE 4 the roasted, blanched peanuts are carried at substantially constant rate from the blancher by belt 28 and divided by guide 30 so that approximately half of the peanuts are fed into each of the channels 32. The consistency of action of gravity upon the peanuts situated on the portion of the belt 28 proceeding about the pulley 29 causes them to be fed along a predetermined path into channels 32 in alignment with the orifices 38 of the nozzles 36. The air jets which emanate from orifices 38 thrust the peanuts toward the screen 34 at high speed, causing them to impinge on the surfaces of sidewalls 34a. The peanuts then rebound from the screen 34 and as they progress downwardly are caught by air streams from lower orifices where the impact cycle repeats. The peanuts thus rebound and impact repeatedly and finally fall through the bottom openings in channels 32. Skin particles and foreign material are broken loose of the peanuts by the multiple impact action described. The suction means then pulls the skin particles and foreign material from channels 32 through the interstices of screen sidewalls 34a and into suction port 40, thereby separating the peanut meats from the removed skin particles and foreign material. The cleaned peanut meats which have fallen through the bottom openings of channels 32 are then collected for the subsequent grinding operation.

The present process may also be used for blanching roasted peanuts with losses comparable to blanchers used in the industry but without the usual forceful abrasive action which grinds particles of skin, or other materials into peanut surfaces.

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:
1. A process for cleaning blanched peanuts to remove skin particles and foreign material comprising the steps of:
   (A) gravity feeding said peanuts in a predetermined path within a channel at least one continuous portion of the periphery of which is a substantially air pervious, rigid reticulated wall, said wall having an inner surface adjacent said path and an outer surface on the dorsal side thereof;
   (B) directing a plurality of vertically-spaced jets of high velocity air through said path and toward said reticulated wall to thrust said peanuts, as they are falling within said channel, laterally of said predetermined path at high velocity in the direction of said reticulated wall and to impinge and reimpinge said peanuts and rebounding peanuts against the inner surface of said wall in order to subject each peanut to a multiplicity of impingements against said wall as the peanuts move downwardly within said channel whereby adhering and embedded skin particles and foreign material are loosened from said peanuts, said jets of air having a velocity in excess of 3000 feet per minute at a flow rate of at least 60 cubic feet per minute;
   (C) simultaneously applying suction to the outer surface of said reticulated wall and therewith effecting the air separation of the peanuts from the loosened skin particles and foreign material;
   (D) and collecting cleaned peanuts at the bottom of said channel.

2. A process for cleaning blanched peanuts to remove skin particles and foreign material comprising the steps of:
   (A) gravity feeding said peanuts in a predetermined path within a channel having as its periphery a substantially air pervious, rigid, reticulated wall of circular horizontal cross-section, said wall having an inner surface adjacent said path and an outer surface on the dorsal side thereof;
   (B) directing a plurality of vertically-spaced jets of air having a velocity in excess of 3000 feet per minute at a flow rate of at least 60 cubic feet per minute through said path and toward said reticulated wall, the uppermost air jets being directed to thrust said peanuts, as they are falling within said channel, laterally of said predetermined path in a direction substantially normal to said wall and the succeeding lower air jets being directed to progressively change the direction of said thrust step-by-step to one which approaches a tangent to said wall to abrade and move said peanuts against and around the inner surface of said wall at the bottom of said channel, whereby adhering and embedded skin particles and foreign material are loosened from said peanuts;
   (C) simultaneously applying suction to the outer surface of said reticulated wall and therewith effecting air separation of the peanuts from the loosened skin particles and foreign material; and
   (D) collecting cleaned peanuts at the bottom of said channel.

3. An apparatus for cleaning roasted, blanched peanuts to remove adhering and embedded skin particles and foreign material, said apparatus comprising:
   (A) a vertically-oriented channel, open at the top and bottom ends and without means to vertically support said peanuts, for continuous gravity feeding said peanuts in a predetermined path, at least one continuous portion of the periphery of said channel comprising an air pervious, reticulated, substantially rigid, stationary wall, the interstices of which have cross-sectional areas less than about 0.0013 square inch; said wall having an inner surface adjacent said path and an outer surface on the dorsal side thereof;
   (B) means for providing air at a pressure substantially above atmospheric;
   (C) an air nozzle connected to said means to reduce the air pressure and increase the air velocity, said air nozzle having a multiplicity of vertically spaced orifices therein adapted to direct the high velocity air discharged therefrom transversely through said path and generally toward said reticulated wall whereby said peanuts are subjected to a multiplicity of impingements against said wall to loosen adhering and embedded skin particles and foreign material from said peanuts;
   (D) suction means acting on the outer surface of said reticulated wall whereby loosened skin particles and foreign material may be removed from said channel through said interstices, and
   (E) means to feed said peanuts into said channel at a substantially constant rate.

4. An apparatus for cleaning roasted, blanched peanuts to remove adhering and embedded skin particles and foreign material, said apparatus comprising:
   (A) an open-ended, inverted, substantially frusto-conically shaped reticulated wall, the interstices of which have cross-sectional areas less than about 0.0013 square inch;
   (B) means for providing air at a pressure substantially above atmospheric;
   (C) an air nozzle connected to said means, said air nozzle having a multiplicity of vertically spaced orifices each of which directs high velocity air emanating therefrom through a segmental portion of the interior of said abrading wall from a direction substantially aligned with a chord bounding said segmental portion, the air emanating from the uppermost orifice proceeding in a diametrical direction across the interior of said wall and each succeeding lower orifice progressively changing the direction of the air issuing therefrom to result in step-by-step alignment with chords of successively reduced length from the uppermost to the lowermost orifice;
   (D) suction means acting on the exterior of said wall, said suction means being at a substantially lower pressure than the interior of said abrading surface, and
   (E) means to feed said peanuts into said channel at a substantially constant rate.

5. An apparatus for cleaning roasted, blanched peanuts to remove adhering and embedded skin particles and foreign material, said apparatuts comprising a rectangular enclosure open at the top and partially open at the bottom and comprising a front wall, back wall, bottom wall, and side walls; a rectangular slot toward the top and running the width of said back wall through which peanuts are fed into said enclosure; a vertically-oriented stationary screen member of rectangular cross-section centered within said enclosure and extending from said bottom wall to a level directly below said slot to define within said enclosure a pair of similarly sized, oppositely disposed vertically-oriented channels each of which lies intermedate a side wall of said screen member and one of said side walls of said enclosure and is open at its top and bottom ends, said screen member being constructed from an air pervious substantially rigid, metallic fabric, the interstices of which are less than about 0.0013 square inch; vertically-oriented nozzles within said channels and contiguous to said enclosure side walls, said nozzles being connected to a means for providing air at a pressure substantially above atmospheric, each of said nozzles containing a multiplicity of vertically-spaced orifices which are substantially opposite said screen side walls whereby they discharge air jets in a direction generally perpendicular to said screen side walls; said top opening in said enclosure being in communication with a suction means for collecting debris.

6. An apparatus for cleaning roasted, blanched peanuts to remove adhering and embedded skin particles and foreign material, said apparatus comprising:

(A) an open-ended, vertically-oriented channel for gravity feeding peanuts in a predetermined path at least one continuous portion of the periphery of said channel comprising an endless, air pervious, reticulated, substantially rigid, wire mesh wall having a substantially circular horizontal cross-section; the interstices of said wall having cross-sectional areas less than about 0.0013 square inch, said wall having an inner surface adjacent said path and an outer surface on the dorsal side thereof;

(B) means for providing air at a pressure substantially above atmospheric;

(C) an air nozzle connected to said means to reduce the air pressure and increase the air velocity, said nozzle being provided with a multiplicity of vertically-spaced orifices adapted to direct the high velocity air discharged therefrom transversely through said path and toward said reticulated wall, said orifices being arranged in a helical pattern on said nozzle, the uppermost orifice facing approximately diametrical with respect to said wall, each succeeding lower orifice being located at an angle with the preceding one and the lowermost orifice facing in a direction almost tangential to said wall;

(D) suction means acting on the outer surface of said reticulated wall whereby skin particles and foreign material may be removed from said channel through said interstices; and (E) means to feed said peanuts into said channel at a substantially constant rate.

References Cited

UNITED STATES PATENTS

| | | | |
|---|---|---|---|
| 414,431 | 11/1889 | Morse | 146—253 |
| 1,206,258 | 11/1916 | Salomon | 146—32 X |
| 2,564,916 | 8/1951 | Nemir | 146—32 |

WILLIAM W. DYER, Jr., *Primary Examiner.*

GRAYDON ABERCROMBIE, *Examiner.*